(12) United States Patent
Yontay et al.

(10) Patent No.: US 10,962,966 B2
(45) Date of Patent: Mar. 30, 2021

(54) EQUIPMENT PROCESS MONITORING SYSTEM WITH AUTOMATIC CONFIGURATION OF CONTROL LIMITS AND ALERT ZONES

(71) Applicant: Intel Corporation, Santa Clara, CA (US)

(72) Inventors: Petek Yontay, Tempe, AZ (US); Rita Chattopadhyay, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 140 days.

(21) Appl. No.: 16/071,889

(22) PCT Filed: Feb. 11, 2016

(86) PCT No.: PCT/US2016/017609
§ 371 (c)(1),
(2) Date: Jul. 20, 2018

(87) PCT Pub. No.: WO2017/138948
PCT Pub. Date: Aug. 17, 2017

(65) Prior Publication Data
US 2019/0033824 A1   Jan. 31, 2019

(51) Int. Cl.
*G05B 23/02* (2006.01)
(52) U.S. Cl.
CPC ............. *G05B 23/0208* (2013.01); *G05B 2219/23446* (2013.01); *G05B 2219/34464* (2013.01); *G05B 2219/50185* (2013.01)
(58) Field of Classification Search
None
See application file for complete search history.

(56) References Cited

U.S. PATENT DOCUMENTS 5,719,796 A    2/1998  Cheng
6,519,552 B1   2/2003  Sampath et al.
(Continued)

FOREIGN PATENT DOCUMENTS

KR    10-2007-000187 A    1/2007

OTHER PUBLICATIONS

International Search Report and Written Opinion dated Oct. 27, 2016 for International Application No. PCT/US2016/017609, 10 pages.

*Primary Examiner* — Sean Shechtman
(74) *Attorney, Agent, or Firm* — Schwabe, Williamson & Wyatt, P.C.

(57) ABSTRACT

Apparatuses, methods and storage medium associated with monitoring or assisting in monitoring of an equipment process are disclosed herein. In embodiments, an apparatus may comprise an analyzer to: receive a plurality of simulation results of a plurality of control limit and alert zone combinations for potential use with a control chart to monitor the equipment process, and calculate a plurality of performance metrics for each of the plurality of control limit and alert zone combinations, using the plurality of simulation results. The apparatus may further select an optimal combination of control limits and alert zones, based at least in part on the plurality of performance metrics, and configure an equipment process monitor with the selected optimal combination of control limits and alert zones for use with a control chart to monitor the equipment process. Other embodiments may be described or claimed.

20 Claims, 4 Drawing Sheets

(56) References Cited

U.S. PATENT DOCUMENTS

| | | | |
|---|---|---|---|
| 2002/0055826 A1 | 5/2002 | Wegerich et al. | |
| 2003/0139908 A1 | 7/2003 | Wegerich et al. | |
| 2005/0144537 A1* | 6/2005 | Cataltepe | G05B 23/0243 |
| | | | 714/47.2 |
| 2005/0187725 A1* | 8/2005 | Cox | G01R 13/0209 |
| | | | 702/60 |
| 2014/0351642 A1* | 11/2014 | Bates | G06F 11/0709 |
| | | | 714/26 |

* cited by examiner

EQUIPMENT PROCESS MONITORING SYSTEM WITH AUTOMATIC CONFIGURATION OF CONTROL LIMITS AND ALERT ZONES

CROSS REFERENCE TO RELATED APPLICATIONS

The present application is a national phase entry under 35 U.S.C. § 371 of International Application No. PCT/US2016/017609, filed Feb. 11, 2016, entitled "EQUIPMENT PROCESS MONITORING SYSTEM WITH AUTOMATIC CONFIGURATION OF CONTROL LIMITS AND ALERT ZONES", which designated, among the various States, the United States of America. The PCT/US2016/017609 Application is hereby incorporated by reference in its entirety.

TECHNICAL FIELD

The present disclosure relates to the field of monitoring systems. More particularly, the present disclosure relates to equipment process monitoring system with automatic configuration of control limits and alert zones.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Analytic modules or statistical processes often have data dependent parameters such as detection thresholds, control limits etc. which are required to be configured a priori by the users based on data analysis or domain knowledge. This configuration is generally done manually through a user interface. Hence, large scale deployment of analytics becomes a very tedious and time consuming exercise.

Additionally, it is an effort intensive exercise to analyze data and determine the best control chart parameters. It is generally done by data scientists manually using trial and error methods. Hence the search for the best control chart parameters is generally limited to a small set of parameters. Alternatively, the control chart parameters would be configured manually based on domain knowledge and rule of thumb. Both practices do not guarantee an optimal solution for a specific deployment.

Further, as time progresses, the characteristics of the machine signals change due to wear and tear. Hence the definition of normal condition may change. Accordingly, the configuration parameters would require re-initialization or re-calibration for accurate operation of the analytic modules, resulting in re-performance of the effort intensive exercise to analyze data and determine the best control chart parameters.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
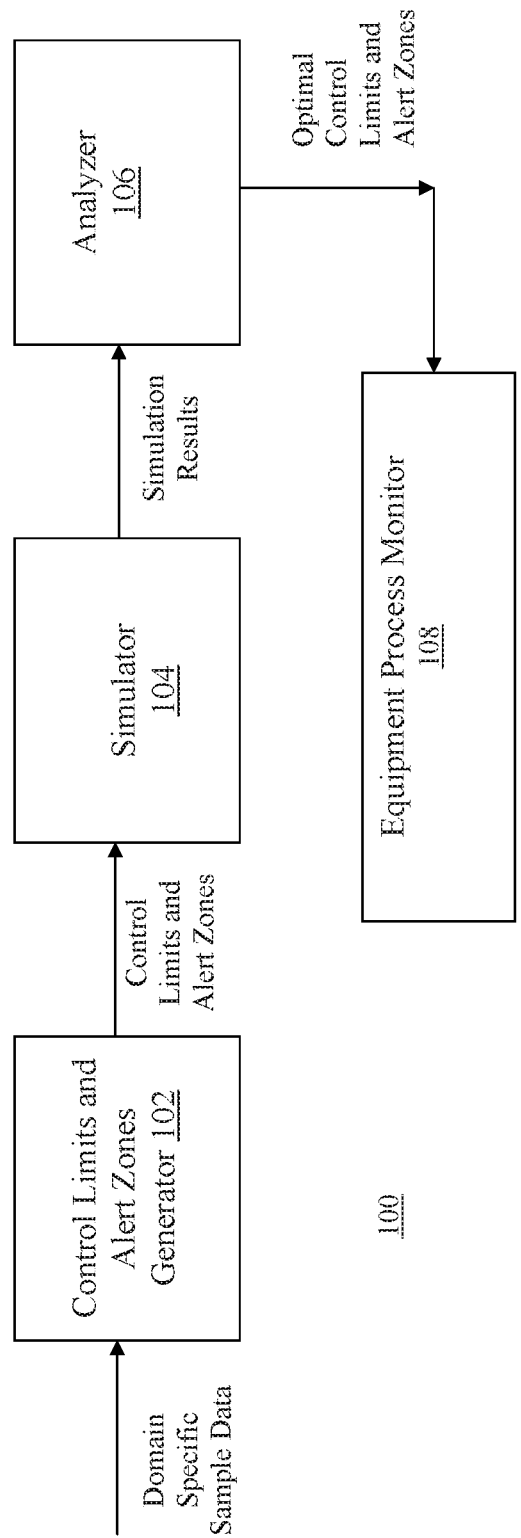
FIG. 1 illustrates an overview of an equipment process monitoring system with automatic configuration of control limits and alert zones of the present disclosure, according to various embodiments.

Apparatuses, methods and storage medium associated with monitoring or assisting in monitoring of an equipment process are disclosed herein. In embodiments, an apparatus may comprise one or more processors, and an analyzer to be operated by the one or more processors to: receive a plurality of simulation results of a plurality of control limit and alert zone combinations for potential use with a control chart to monitor the equipment process, and calculate a plurality of performance metrics for each of the plurality of control limit and alert zone combinations, using the plurality of simulation results. The apparatus may further select an optimal combination of control limits and alert zones from the plurality of control limit and alert zone combinations, based at least in part on the plurality of performance metrics, and configure an equipment process monitor with the selected optimal combination of control limits and alert zones for use with the control chart to monitor the equipment process.

In embodiments, the apparatus may further comprise the simulator to perform the simulations, a generator to generate the various control limit and alert zone combinations (based on domain specific data of the equipment process), and/or an equipment process monitor to monitor the equipment process (using the selected optimal combination of control limits and alert zones).

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, wherein an overview of an equipment process monitoring system with automatic configuration of control limits and alert zones, according to various embodiments, is illustrated. As shown, for the illustrated embodiments, equipment process monitoring system 100 may include control limits and alert zones generator 102, simulator 104, analyzer 106, and equipment process monitor 108, coupled with each other.

Control limits and alert zones generator 102 may be configured to receive domain specific sample data of the equipment process to be monitored by equipment process monitor 108. In response, control limits and alert zones generator 102 may generate a plurality of combinations of control limits and alert zones for potential use with a control chart employed by equipment process monitor 108 to monitor the equipment process. In various embodiments, control limits and alert zones generator 102 may be configured to generate a large number of combinations, in tens of thousands, e.g., 20,000 combinations.

In some embodiments, the control chart employed by equipment process monitor 108 to monitor the equipment process may be a modified version of the Western Electric Rules. Each control limit and alert zone combination may include a moving window length, and three different standard deviation (sigma) limits to denote three different alert zones. In response to receipt of domain specific sample data of an equipment process to be monitored, control limits and alert zones generator 102 may generate tens of thousands of control limit and alert zone combinations, each having a moving window length, and three different standard deviation (sigma) limits to denote three different alert zones.

Simulator 104 may be configured to perform simulation of the equipment process monitoring for each of the control limit and alert zone combinations, and generate respective simulation results. Simulator 104 may be any one of a number of simulators known in the art, including but is not limited to, MATLAB, available from MathWork of Natick, Mass.

Analyzer 106 may be configured to receive the various simulation results of the various control limit and alert zone combinations, compute a plurality of performance metrics for each set of simulation results of a corresponding control limit and alert zone combination, and select an optimal combination of control limits and alert zones for use with the control chart, based at least in part on the calculated performance metrics.

In various embodiments, the performance metrics calculated for each set of control limit and alert zone combination may include a true positive rate (TPR), a false positive rate (FPR), a true negative rate (TNR), and/or a false negative rate (FNR), as follows:

$$TPR=TP/P=TP/(TP+FN)$$

$$FPR=FP/N=FP/(FP+TN)$$

$$TNR=TN/N=TN/(FP+TN)$$

$$FNR=FN/P=FN/(FN+TP)$$

where P, TP and FP=Positive, True Positive, and False Positive, and

N, TN and FN=Negative, True Negative and False Negative respectively.

Additionally, the performance metrics calculated for each set of control limit and alert zone combination may further include:

$$Precision=TP/(TP+FP)$$

$$Accuracy=(TP+TN)/(P+N) \text{ and}$$

$$Distance=Sqrt(FPR2+(1-TPR)2)$$

where the distance of each set of control limit and alert zone combination represents the distance of the (FPR, TPR) pair of the control limit and alert zone combination from the best point of (FPR=0, and TPR=1) on a receiver operating characteristic (ROC) curve.

For these embodiments, analyzer 106 may be configured to select the control limit and alter zone combination with the smallest distance from the best point of (FPR=0, and TPR=1) as the optimal combination of control limits and alert zones for configuring equipment process monitor 108 for use with the control chart to monitor the equipment process.

In various embodiments, analyzer 106 may be configured to automatically configured equipment process monitor 108 to monitor the equipment process, using the selected optimal combination of control limits and alert zones, without user/system administrator intervention, on selection of the optimal combination of control limits and alert zones.

Equipment process monitor 108 may be configured to monitoring any one of a number of equipment processes, using a control chart with control limits and alert zones, such as the earlier mentioned modified version of the Western Electric Rules. Equipment process monitor 108 may be configured with an interface (not shown) to enable analyzer 106 to automatically configure equipment process monitor 108 with the selected optimal combination of control limits and alert zones for the equipment process. For example, the interface may be a direct cable allowing analyzer 106 to be directly coupled to equipment process monitor 108. Other examples may be a local area networking interface or a wireless networking interface to allowing analyzer 106 to automatically configure equipment process monitor 108 remotely. Except for the interface (and any other additional components) to enable the automatic configuration by analyzer 106, equipment process monitor may be any one of a number of known monitors for monitoring equipment processes, such as equipment processes in the semiconductor industry, automotive industry, aerospace industry, and so forth.

In various embodiments, control limits and alert zones generator 102 and analyzer 106 may be implemented with ASIC, a programmable circuit programmed with the operating logic, or a processor (shared or dedicated) and/or memory (shared or dedicated) having one or more software or firmware programs, which in response to execution, cause the host device to perform the earlier described operations.

Figure 2:
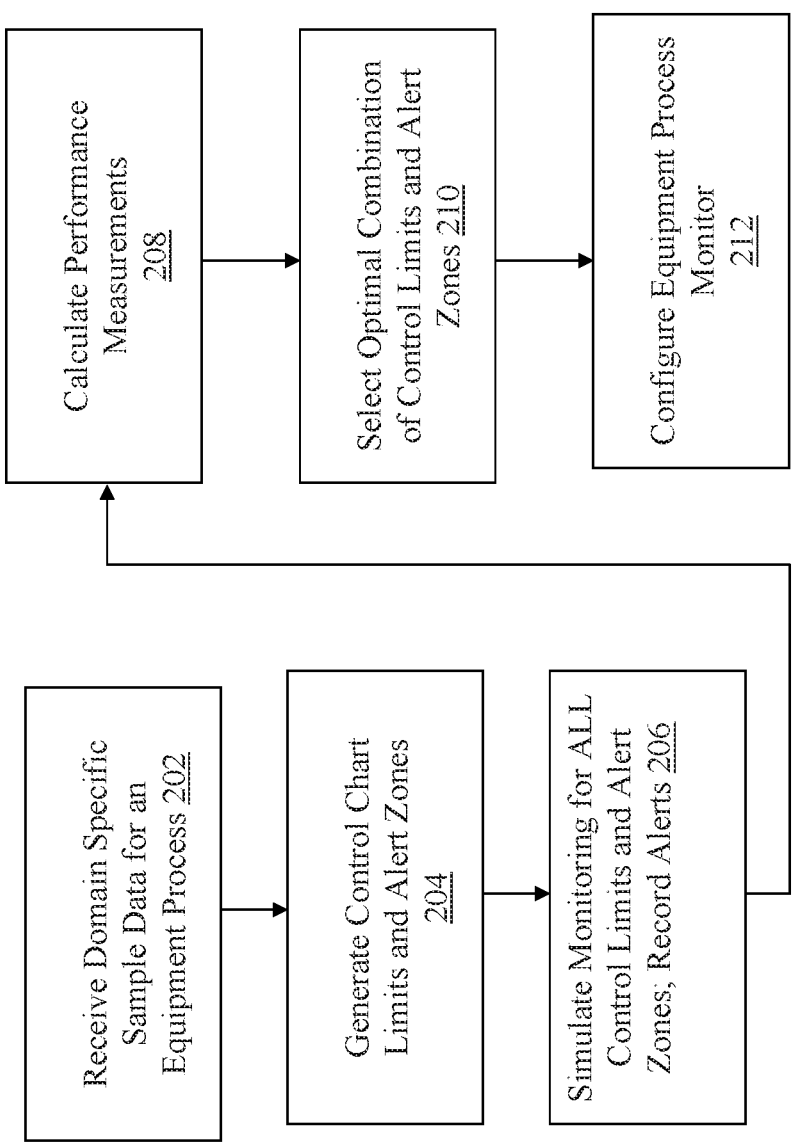
FIG. 2 illustrates an example process for monitoring equipment process, including automatic configuring of control limits and alert zones, according to various embodiments.

FIG. 2 illustrates an example process for monitoring equipment process, including automatic configuring of control limits and alert zones, according to various embodiments. As shown, process 200 for monitoring equipment process that includes automatic configuring of control limits and alert zones may include operations performed at blocks 202-212. The operations may be performed by the earlier described control limits and alert zones generator 102, simulator 104 and analyzer 106.

Process 200 may start at block 202. At block 202, domain specific sample data for an equipment process to be monitored may be received. At block 204, a multitude (in tens of thousands) of combinations of control limits and alert zones for potential use with a control chart may be generated, based on the domain specific sample data. The operations at blocks 202-204 may be performed, e.g., by control limit and alert zone generator 102 of FIG. 1.

At block 206, simulations may be performed by each combination of control limits and alert zones, with the generated alerts recorded and output as simulation results. The operations at block 206 may be performed, e.g. by simulator 104 of FIG. 1.

On simulations, at block 208, performance measurements or metrics may be calculated for the various control limit and alert zone combinations, based on the corresponding simulation results for the various combinations. As described earlier, the calculations may include, but are not limited to the calculations of TPR, TNR, FPR, FNR, precision, accuracy and distance, as defined earlier. On calculation, at block 210, the optimal combination of control limits and alert zones for use with a control chart to monitor equipment process may be selected. On selection, at block 212, the equipment process monitor may be automatically configured, without user or system administrator intervention. The operations at block 208-212 may be performed, e.g., by analyzer 106 of FIG. 1.

For ease of understanding, process 200 have been described with the generation, simulation and calculation operations of block 204-208 being performed in order. In some embodiments, the operations may be pipelined and/or paralleled. That is, simulation for one set of combination of control limits and alert zones may be started as soon as it is generated, while another set of combination of control limits and alert zones is being generated. Similarly, calculation of performance measurements for one set of combination of control limits and alert zones may be started as soon as the simulation results are obtained, while simulation for another set of combination of control limits and alert zones is being performed. In some embodiments, multiple generators, simulators and/or analyzers may be employed.

Figure 3:
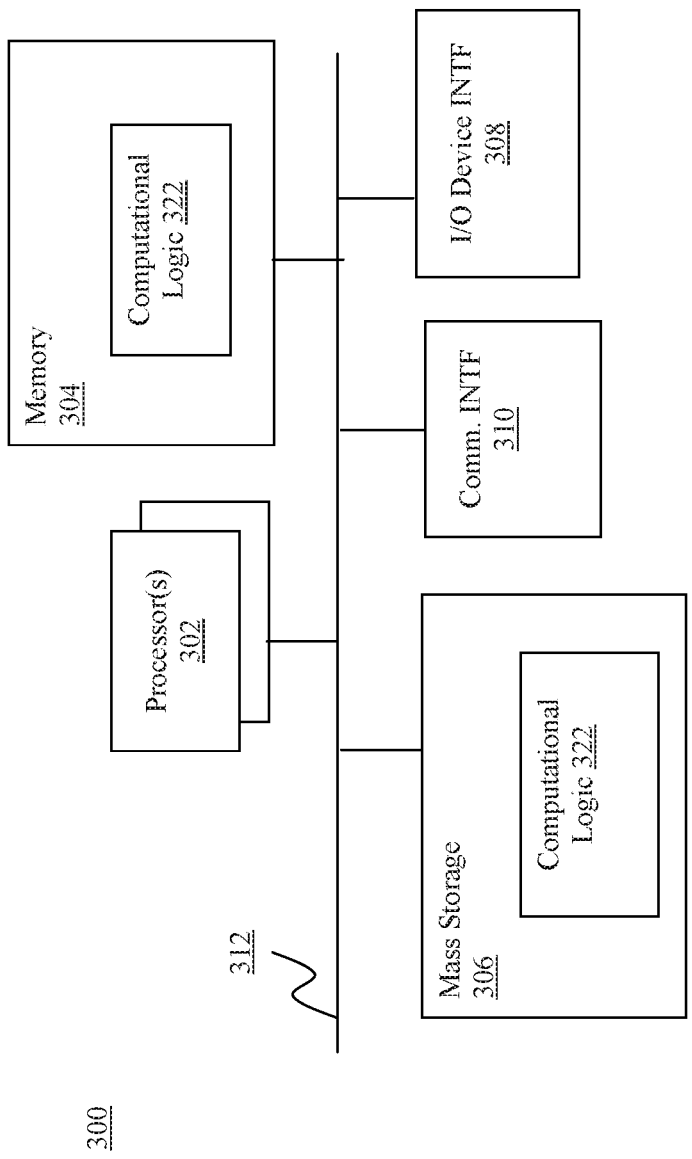
FIG. 3 illustrates an example computer system suitable for use to practice various aspects of the present disclosure, according to various embodiments.
Figure 4:
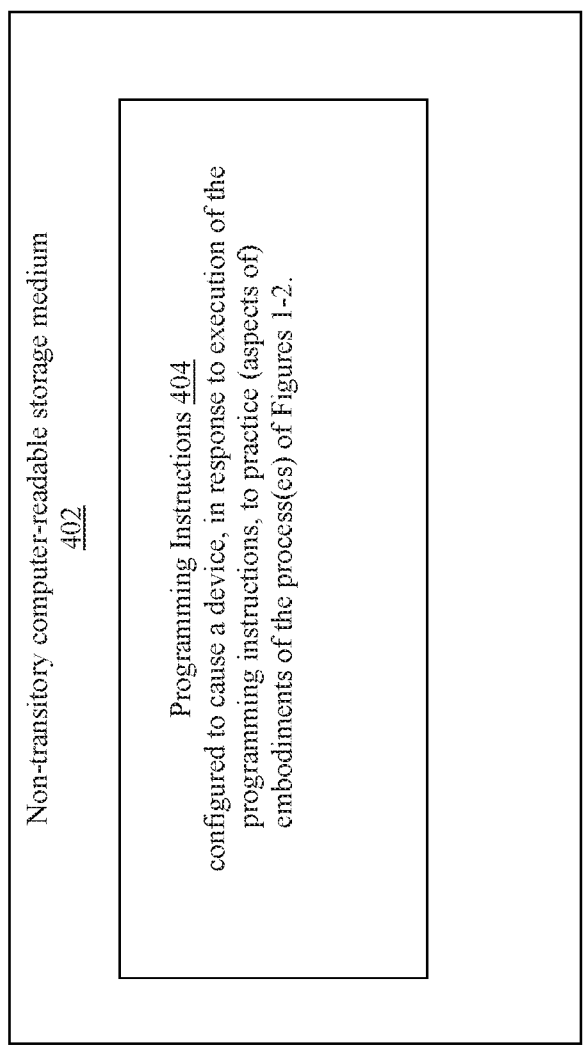
FIG. 4 illustrates a storage medium having instructions for practicing methods described with references to FIGS. 1-2, according to various embodiments.

FIG. 3 illustrates an example computer system that may be suitable for use to practice selected aspects of the present disclosure. As shown, computer 300 may include one or more processors or processor cores 302, and system memory 304. For the purpose of this application, including the claims, the term "processor" refers to a physical processor, and the terms "processor" and "processor cores" may be considered synonymous, unless the context clearly requires otherwise. Additionally, computer 300 may include mass storage devices 306 (such as diskette, hard drive, compact disc read only memory (CD-ROM) and so forth), input/output devices 308 (such as display, keyboard, cursor control and so forth) and communication interfaces 310 (such as network interface cards, modems and so forth). The elements may be coupled to each other via system bus 312, which may represent one or more buses. In the case of multiple buses, they may be bridged by one or more bus bridges (not shown).

Each of these elements may perform its conventional functions known in the art. In particular, system memory 304 and mass storage devices 306 may be employed to store a working copy and a permanent copy of the programming instructions implementing the operations associated with control limit and alert zone generator 102, simulator 104, and analyzer 106, earlier described, collectively referred to as computational logic 322. The various elements may be implemented by assembler instructions supported by processor(s) 302 or high-level languages, such as, for example, C, that can be compiled into such instructions.

The number, capability and/or capacity of these elements 310-312 may vary, depending on whether computer 300 is used as a mobile client computing device, a data server or a "thin" cloud server. When use as mobile client computing device, the capability and/or capacity of these elements 310-312 may vary, depending on whether the mobile client computing device is a wearable device, a smartphone, a computing tablet, an ultrabook or a laptop computer. Otherwise, the constitutions of elements 310-312 are known, and accordingly will not be further described.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 6 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 402 may include a number of programming instructions 404. Programming instructions 404 may be configured to enable a device, e.g., computer 300, in response to execution of the programming instructions, to perform operations associated with control limit and alert zone generator 102, simulator 104, and analyzer 106. In alternate embodiments, programming instructions 404 may be disposed on multiple computer-readable non-transitory storage media 402 instead. In alternate embodiments, programming instructions 404 may be disposed on computer-readable transitory storage media 402, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 3, for one embodiment, at least one of processors 302 may be packaged together with memory having computational logic 322 (in lieu of storing on memory 304 and storage 306). For one embodiment, at least one of processors 302 may be packaged together with memory having computational logic 322 to form a System in Package (SiP). For one embodiment, at least one of processors 302 may be integrated on the same die with memory having computational logic 322. For one embodiment, at least one of processors 302 may be packaged together with memory having computational logic 322 to form a System on Chip (SoC). For at least one embodiment, the SoC may be utilized in, e.g., but not limited to, a smartphone or computing tablet.

Thus various example embodiments of the present disclosure have been described including, but are not limited to:

Example 1 may be an apparatus for monitoring or assisting in monitoring an equipment process, comprising: one or more processors; and an analyzer to be operated by the one or more processors to: receive a plurality of simulation results of a plurality of control limit and alert zone combinations for potential use with a control chart to monitor the equipment process, calculate a plurality of performance metrics for each of the plurality of control limit and alert zone combinations, using the plurality of simulation results, select an optimal combination of control limits and alert zones from the plurality of control limit and alert zone combinations, based at least in part on the plurality of performance metrics, and configure, automatically, an equipment process monitor with the selected optimal combination of control limits and alert zones for use with the control chart to monitor the equipment process.

Example 2 may be example 1, further comprises a simulator to perform a plurality of simulations of the equipment process for the plurality of control limit and alert zone combinations to generate and provide the plurality of simulation results to the analyzer.

Example 3 may be example 2, further comprises a generator to receive domain specific sample data for the equipment process, and generate the plurality of control limit and alert zone combinations, based at least in part on the domain specific sample data.

Example 4 may be example 1, wherein a combination of control limit and alert zone comprises a moving window length, and three different standard deviation limits to denote three different alert zones of the control chart.

Example 5 may be example 1, wherein to calculate a plurality of performance metrics for each of the plurality of control limit and alert zone combinations may comprise to calculate a true positive rate and a false positive rate for each of the plurality of control limit and alert zone combinations, using the plurality of simulation results.

Example 6 may be example 5, wherein to calculate a plurality of performance metrics for each of the plurality of control limit and alert zone combinations may further comprise to calculate a true negative rate and a false negative rate for each of the plurality of control limit and alert zone combinations, using the plurality of simulation results.

Example 7 may be example 5, wherein to calculate a plurality of performance metrics for each of the plurality of control limit and alert zone combinations may further comprise to calculate a distance of each pair of true positive rate and false positive rate of a control limit and alert zone combination to a reference point on a receiver operating characteristic curve.

Example 8 may be example 7, wherein the reference point on the receiver operating characteristic curve may have a false positive rate of 0 and a true positive rate of 1.

Example 9 may be example 7, wherein to select an optimal combination of control limits and alert zones from the plurality of control limit and alert zone combinations may comprise to select the optimal combination of control limits and alert zones from the plurality of control limit and alert zone combinations, based at least in part on the distances calculated for the plurality of control limit and alert zone combinations.

Example 10 may be any one of examples 1-9, further comprising the equipment process monitor.

Example 11 may be a method for monitoring or assisting in monitoring an equipment process, comprising: receiving, by a computing device, a plurality of simulation results of a plurality of control limit and alert zone combinations for potential use with a control chart to monitor the equipment process; calculating, by the computing device, a plurality of performance metrics for each of the plurality of control limit and alert zone combinations, using the plurality of simulation results; selecting, by the computing device, an optimal combination of control limits and alert zones from the plurality of control limit and alert zone combinations, based at least in part on the plurality of performance metrics; and configuring, automatically, by the computing device, an equipment process monitor with the selected optimal combination of control limits and alert zones to use with the control chart to monitor the equipment process.

Example 12 may be example 11, further comprising performing a plurality of simulations of the equipment process for the plurality of control limit and alert zone combinations to generate and provide the plurality of simulation results.

Example 13 may be example 12, further comprising receiving domain specific sample data for the equipment process, and generating the plurality of control limit and alert zone combinations, based at least in part on the domain specific sample data.

Example 14 may be example 11, wherein a combination of control limit and alert zone may comprise a moving window length, and three different standard deviation limits to denote three different alert zones of the control chart.

Example 15 may be example 11, wherein calculating a plurality of performance metrics for each of the plurality of control limit and alert zone combinations may comprise calculating a true positive rate and a false positive rate for each of the plurality of control limit and alert zone combinations, using the plurality of simulation results.

Example 16 may be example 15, wherein calculating a plurality of performance metrics for each of the plurality of control limit and alert zone combinations may further comprise calculating a true negative rate and a false negative rate for each of the plurality of control limit and alert zone combinations, using the plurality of simulation results.

Example 17 may be example 15, wherein calculating a plurality of performance metrics for each of the plurality of control limit and alert zone combinations may further comprise calculating a distance of each pair of true positive rate and false positive rate of a control limit and alert zone combination to a reference point on a receiver operating characteristic curve.

Example 18 may be example 17, wherein the reference point on the receiver operating characteristic curve has a false positive rate of 0 and a true positive rate of 1.

Example 19 may be example 17, wherein selecting an optimal combination of control limits and alert zones from the plurality of control limit and alert zone combinations may comprise selecting the optimal combination of control limits and alert zones from the plurality of control limit and alert zone combinations, based at least in part on the distances calculated for the plurality of control limit and alert zone combinations.

Example 20 may be any one of examples 11-19, further comprising monitoring the equipment process, using the automatically configured equipment process monitor.

Example 21 may be one or more computer-readable media comprising instructions that cause a computing device, in response to execution of the instructions by the computing device, to: receive a plurality of simulation results of a plurality of control limit and alert zone combinations for potential use with a control chart to monitor an equipment process; calculate a plurality of performance metrics for each of the plurality of control limit and alert zone combinations, using the plurality of simulation results; select an optimal combination of control limits and alert zones from the plurality of control limit and alert zone combinations, based at least in part on the plurality of performance metrics; and configure, automatically, an equipment process monitor with the selected optimal combination of control limits and alert zones for use with the control chart to monitor the equipment process.

Example 22 may be example 21, wherein the computing device may be further caused to perform a plurality of simulations of the equipment process for the plurality of control limit and alert zone combinations to generate and provide the plurality of simulation results to the analyzer.

Example 23 may be example 22, wherein the computing device may be further caused to receive domain specific sample data for the equipment process, and generate the plurality of control limit and alert zone combinations, based at least in part on the domain specific sample data.

Example 24 may be example 21, wherein a combination of control limit and alert zone may comprise a moving window length, and three different standard deviation limits to denote three different alert zones of the control chart.

Example 25 may be any one of examples 21-24, wherein to calculate a plurality of performance metrics for each of the plurality of control limit and alert zone combinations may comprise to calculate a true positive rate and a false positive rate for each of the plurality of control limit and alert zone combinations, using the plurality of simulation results.

Example 26 may be example 25, wherein to calculate a plurality of performance metrics for each of the plurality of control limit and alert zone combinations may further comprise to calculate a true negative rate and a false negative rate for each of the plurality of control limit and alert zone combinations, using the plurality of simulation results.

Example 27 may be example 25, wherein to calculate a plurality of performance metrics for each of the plurality of control limit and alert zone combinations may further comprise to calculate a distance of each pair of true positive rate and false positive rate of a control limit and alert zone combination to a reference point on a receiver operating characteristic curve.

Example 28 may be example 27, wherein the reference point on the receiver operating characteristic curve has a false positive rate of 0 and a true positive rate of 1.

Example 29 may be example 27, wherein to select an optimal combination of control limits and alert zones from the plurality of control limit and alert zone combinations may comprise to select the optimal combination of control limits and alert zones from the plurality of control limit and alert zone combinations, based at least in part on the distances calculated for the plurality of control limit and alert zone combinations.

Example 30 may be an apparatus for monitoring or assisting in monitoring of an equipment process, comprising: means for receiving a plurality of simulation results of a plurality of control limit and alert zone combinations for potential use with a control chart to monitor the equipment process; means for calculating a plurality of performance metrics for each of the plurality of control limit and alert zone combinations, using the plurality of simulation results; means for selecting an optimal combination of control limits and alert zones from the plurality of control limit and alert zone combinations, based at least in part on the plurality of performance metrics; and means for configuring an equipment process monitor with the selected optimal combination of control limits and alert zones for use with the control chart to monitor the equipment process.

Example 31 may be example 30, further comprising means for performing a plurality of simulations of the equipment process for the plurality of control limit and alert zone combinations to generate and provide the plurality of simulation results.

Example 32 may be example 31, further comprising means for receiving domain specific sample data for the equipment process, and means for generating the plurality of control limit and alert zone combinations, based at least in part on the domain specific sample data.

Example 33 may be example 30, wherein a combination of control limit and alert zone may comprise a moving window length, and three different standard deviation limits to denote three different alert zones of the control chart.

Example 34 may be example 30, wherein means for calculating a plurality of performance metrics for each of the plurality of control limit and alert zone combinations may comprise means for calculating a true positive rate and a false positive rate for each of the plurality of control limit and alert zone combinations, using the plurality of simulation results.

Example 35 may be example 34, wherein means for calculating a plurality of performance metrics for each of the plurality of control limit and alert zone combinations may further comprise means for calculating a true negative rate and a false negative rate for each of the plurality of control limit and alert zone combinations, using the plurality of simulation results.

Example 36 may be example 34, wherein means for calculating a plurality of performance metrics for each of the plurality of control limit and alert zone combinations may further comprise means for calculating a distance of each pair of true positive rate and false positive rate of a control limit and alert zone combination to a reference point on a receiver operating characteristic curve.

Example 37 may be example 36, wherein the reference point on the receiver operating characteristic curve may have a false positive rate of 0 and a true positive rate of 1.

Example 38 may be example 36, wherein means for selecting an optimal combination of control limits and alert zones from the plurality of control limit and alert zone combinations may comprise means for selecting the optimal combination of control limits and alert zones from the plurality of control limit and alert zone combinations, based at least in part on the distances calculated for the plurality of control limit and alert zone combinations.

Example 39 may be any one of examples 30-38, further comprising the equipment process monitor.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus for monitoring or assisting in monitoring a semiconductor, aerospace or automotive industry equipment process, comprising:
   one or more processors; and
   an analyzer to be operated by the one or more processors to:
   receive a plurality of simulation results of a plurality of control limit and alert zone combinations for potential use with a control chart to monitor the semiconductor, aerospace or automotive industry equipment process,
   calculate a plurality of performance metrics for each of the plurality of control limit and alert zone combinations, using the plurality of simulation results,
   select an optimal combination of control limits and alert zones from the plurality of control limit and alert zone combinations, based at least in part on the plurality of performance metrics, and
   configure, automatically, an equipment process monitor device with the selected optimal combination of control limits and alert zones for use with the control chart to monitor the semiconductor, aerospace or automotive industry equipment process;
   wherein to calculate a plurality of performance metrics for each of the plurality of control limit and alert zone combinations comprises to calculate a true positive rate and a false positive rate for each of the plurality of control limit and alert zone combinations, using the plurality of simulation results; and
   wherein to calculate a plurality of performance metrics for each of the plurality of control limit and alert zone combinations further comprises to calculate a distance of each pair of true positive rate and false positive rate of a control limit and alert zone combination to a reference point on a receiver operating characteristic curve.

2. The apparatus of claim 1, further comprising a simulator to perform a plurality of simulations of the equipment process for the plurality of control limit and alert zone combinations to generate and provide the plurality of simulation results to the analyzer.

3. The apparatus of claim 2, further comprising a generator to receive domain specific sample data for the equipment process, and generate the plurality of control limit and alert zone combinations, based at least in part on the domain specific sample data.

4. The apparatus of claim 1, wherein a combination of control limit and alert zones comprises a moving window length, and three different standard deviation limits to denote three different alert zones of the control chart.

5. The apparatus of claim 1, wherein to calculate a plurality of performance metrics for each of the plurality of control limit and alert zone combinations further comprises to calculate a true negative rate and a false negative rate for each of the plurality of control limit and alert zone combinations, using the plurality of simulation results.

6. The apparatus of claim 1, wherein the reference point on the receiver operating characteristic curve has a false positive rate of 0 and a true positive rate of 1.

7. The apparatus of claim 1, wherein to select an optimal combination of control limits and alert zones from the plurality of control limit and alert zone combinations comprises to select the optimal combination of control limits and alert zones from the plurality of control limit and alert zone combinations, based at least in part on the distances calculated for the plurality of control limit and alert zone combinations.

8. The apparatus of claim 1, further comprising the equipment process monitor device.

9. A method for monitoring or assisting in monitoring a semiconductor, automotive or aerospace industry equipment process, comprising:
   receiving, by a computing device, a plurality of simulation results of a plurality of control limit and alert zone combinations for potential use with a control chart to monitor the semiconductor, automotive or aerospace industry equipment process;
   calculating, by the computing device, a plurality of performance metrics for each of the plurality of control limit and alert zone combinations, using the plurality of simulation results;
   selecting, by the computing device, an optimal combination of control limits and alert zones from the plurality of control limit and alert zone combinations, based at least in part on the plurality of performance metrics; and
   configuring, automatically, by the computing device, an equipment process monitor device with the selected optimal combination of control limits and alert zones to use with the control chart to monitor the semiconductor, automotive or aerospace industry equipment process;
   wherein calculating a plurality of performance metrics for each of the plurality of control limit and alert zone combinations comprises calculating a true positive rate and a false positive rate for each of the plurality of control limit and alert zone combinations, using the plurality of simulation results; calculating a plurality of performance metrics for each of the plurality of control limit and alert zone combinations further comprises calculating a true negative rate and a false negative rate for each of the plurality of control limit and alert zone combinations, using the plurality of simulation results; and calculating a plurality of performance metrics for each of the plurality of control limit and alert zone combinations further comprises calculating a distance of each pair of true positive rate and false positive rate of a control limit and alert zone combination to a reference point on a receiver operating characteristic curve.

10. The method of claim 9, further comprising performing a plurality of simulations of the equipment process for the plurality of control limit and alert zone combinations to generate and provide the plurality of simulation results; and
   receiving domain specific sample data for the equipment process, and generating the plurality of control limit and alert zone combinations, based at least in part on the domain specific sample data.

11. The method of claim 9, wherein a combination of control limit and alert zones comprises a moving window length, and three different standard deviation limits to denote three different alert zones of the control chart.

12. The method of claim 9, wherein the reference point on the receiver operating characteristic curve has a false positive rate of 0 and a true positive rate of 1.

13. The method of claim 9, wherein selecting an optimal combination of control limits and alert zones from the plurality of control limit and alert zone combinations comprises selecting the optimal combination of control limits and alert zones from the plurality of control limit and alert zone combinations, based at least in part on the distances calculated for the plurality of control limit and alert zone combinations.

14. One or more non-transitory computer-readable media comprising instructions that cause a computing device, in response to execution of the instructions by the computing device, to:

receive a plurality of simulation results of a plurality of control limit and alert zone combinations for potential use with a control chart to monitor a semiconductor, automotive or aerospace industry equipment process;

calculate a plurality of performance metrics for each of the plurality of control limit and alert zone combinations, using the plurality of simulation results;

select an optimal combination of control limits and alert zones from the plurality of control limit and alert zone combinations, based at least in part on the plurality of performance metrics; and configure, automatically, an equipment process monitor device with the selected optimal combination of control limits and alert zones for use with the control chart to monitor the semiconductor, automotive or aerospace industry equipment process;

wherein to calculate a plurality of performance metrics for each of the plurality of control limit and alert zone combinations comprises to calculate a true positive rate and a false positive rate for each of the plurality of control limit and alert zone combinations, using the plurality of simulation results; and wherein to calculate a plurality of performance metrics for each of the plurality of control limit and alert zone combinations further comprises to calculate a distance of each pair of true positive rate and false positive rate of a control limit and alert zone combination to a reference point on a receiver operating characteristic curve.

15. The one or more non-transitory computer-readable media of claim 14, wherein the computing device is further caused to perform a plurality of simulations of the equipment process for the plurality of control limit and alert zone combinations to generate and provide the plurality of simulation results to the analyzer.

16. The one or more non-transitory computer-readable media of claim 15, wherein the computing device is further caused to receive domain specific sample data for the equipment process, and generate the plurality of control limit and alert zone combinations, based at least in part on the domain specific sample data.

17. The one or more non-transitory computer-readable media of claim 14, wherein a combination of control limit and alert zone comprises a moving window length, and three different standard deviation limits to denote three different alert zones of the control chart.

18. The one or more non-transitory computer-readable media of claim 14 wherein to calculate a plurality of performance metrics for each of the plurality of control limit and alert zone combinations further comprises to calculate a true negative rate and a false negative rate for each of the plurality of control limit and alert zone combinations, using the plurality of simulation results.

19. The one or more non-transitory computer-readable media of claim 14, wherein the reference point on the receiver operating characteristic curve has a false positive rate of 0 and a true positive rate of 1.

20. The one or more non-transitory computer-readable media of claim 14, wherein to select an optimal combination of control limits and alert zones from the plurality of control limit and alert zone combinations comprises to select the optimal combination of control limits and alert zones from the plurality of control limit and alert zone combinations, based at least in part on the distances calculated for the plurality of control limit and alert zone combinations.

* * * * *